(12) United States Patent
Liao (10) Patent No.: US 10,514,230 B2
(45) Date of Patent: Dec. 24, 2019

(54) VALVE DEVICE FOR TOY GUN

(71) Applicant: GUAY GUAY TRADING CO., LTD., Changhua County (TW)

(72) Inventor: Yin-Hsi Liao, Changhua County (TW)

(73) Assignee: GUAY GUAY TRADING CO., LTD., Changhua County (TW)

( * ) Notice: Subject to any disclaimer, the term of this patent is extended or adjusted under 35 U.S.C. 154(b) by 0 days.

(21) Appl. No.: 15/989,119

(22) Filed: May 24, 2018

(65) Prior Publication Data
US 2019/0360776 A1 Nov. 28, 2019

(51) Int. Cl.
| | |
|---|---|
| *F41B 11/723* | (2013.01) |
| *F41B 11/62* | (2013.01) |
| *F16K 15/18* | (2006.01) |
| *F16K 1/30* | (2006.01) |

(52) U.S. Cl.
CPC .............. *F41B 11/723* (2013.01); *F16K 1/30* (2013.01); *F16K 15/18* (2013.01); *F41B 11/62* (2013.01); *Y10T 137/7904* (2015.04)

(58) Field of Classification Search
CPC .. F41B 11/723; F41B 11/62; Y10T 137/7904; F16K 15/18; F16K 1/30–308
USPC .... 137/528; 251/149.1, 149.5, 144, 325, 57; 124/69–70
See application file for complete search history.

(56) References Cited

U.S. PATENT DOCUMENTS

| | | | | |
|---|---|---|---|---|
| 860,017 | A * | 7/1907 | Cuneo .................. | F16K 15/04 137/329.03 |
| 2,557,807 | A * | 6/1951 | Wagner .................. | F16K 1/303 222/3 |
| 4,570,669 | A * | 2/1986 | Pauliukonis ............ | F16K 15/06 137/528 |
| 5,791,328 | A * | 8/1998 | Alexander ............. | F41B 11/723 124/73 |
| 6,000,417 | A * | 12/1999 | Jacobs ................... | F16K 15/023 137/2 |
| 6,029,645 | A * | 2/2000 | Wonisch ................. | F41B 11/62 124/74 |
| 6,409,150 | B2 * | 6/2002 | Sullivan, Sr. ............ | F16K 1/12 124/73 |
| 6,851,447 | B1 * | 2/2005 | Carroll ................. | G05D 16/103 137/505.25 |
| 7,600,509 | B2 * | 10/2009 | Gabrel .................. | F41B 11/724 124/73 |
| 8,132,564 | B2 * | 3/2012 | Stone ...................... | F17C 13/04 124/74 |
| 9,194,647 | B2 * | 11/2015 | Maeda .................... | F41B 11/62 |

* cited by examiner

*Primary Examiner* — John Bastianelli
(74) *Attorney, Agent, or Firm* — Leong C. Lei (57) ABSTRACT

The valve device includes a main member for installing on a toy gun and connecting to a high-pressure gas source. Inside the main member, there is a first chamber, a second chamber connected to the first chamber, and an inlet channel. A valve member is movably housed in the main member. The valve member includes a valve channel, a through hole, an inlet blocking element, and an outlet blocking element. The valve member selectively blocks the connection between the first chamber and the inlet channel. As such, the pressure difference between the second chamber and the high-pressure gas source drives the valve member to selectively block the inlet channel, without using a spring to control the valve member. The valve device therefore has enhanced operation life and reduced cost.

10 Claims, 9 Drawing Sheets

VALVE DEVICE FOR TOY GUN

BACKGROUND OF THE INVENTION (a) Technical Field of the Invention

The present invention is generally related to toy guns, and more particular to a valve device for a toy gun that allows greater flow and speed for high-pressure gas.

(b) Description of the Prior Art

Toy guns more and more resemble real guns as related technology advances. For example, the toy guns now have replaceable magazines, and may recoil. Many parts of a toy gun required high-pressure gas to function and valves are applied to prevent leakage of gas. The valves are usually driven by springs and their elastic fatigue would reduce their operation life. Replacing these springs also increases cost.

SUMMARY OF THE INVENTION

A major objective of the present invention is to provide a novel valve device where an inlet channel is selectively opened or closed by a pressure difference between a second chamber and the inlet channel, so as to increase operation life and cost saving.

To achieve the objective, the valve device includes a main member for installing on a toy gun and connecting to a high-pressure gas source. Inside the main member, there is a first chamber, a second chamber connected to the first chamber, and an inlet channel. A valve member is movably housed in the main member. The valve member includes a valve channel, a through hole, an inlet blocking element, and an outlet blocking element. The valve member selectively blocks the connection between the first chamber and the inlet channel.

Through the above structure, when the high-pressure gas source is connected to the main member, high-pressure gas enters the inlet channel to provide a greater pressure than that of the second chamber. The high-pressure gas presses the inlet blocking element and drives the valve member so that it will not block the connection between the first chamber and the inlet channel. The high-pressure gas then enters the first chamber via the valve member and the through hole, then into second chamber, and finally into the toy gun through the second chamber.

When the high-pressure gas source is not connected to the main member or stops to provide high-pressure gas, the pressure in the second chamber is greater than that of the inlet channel and therefore presses the outlet blocking element to drive the valve member. The connection between the first chamber and the inlet channel is therefore blocked. With the above described mechanism, the valve member is controlled without using a spring. There is no operation life issue due to spring fatigue, and production cost is reduced by omitting the spring.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
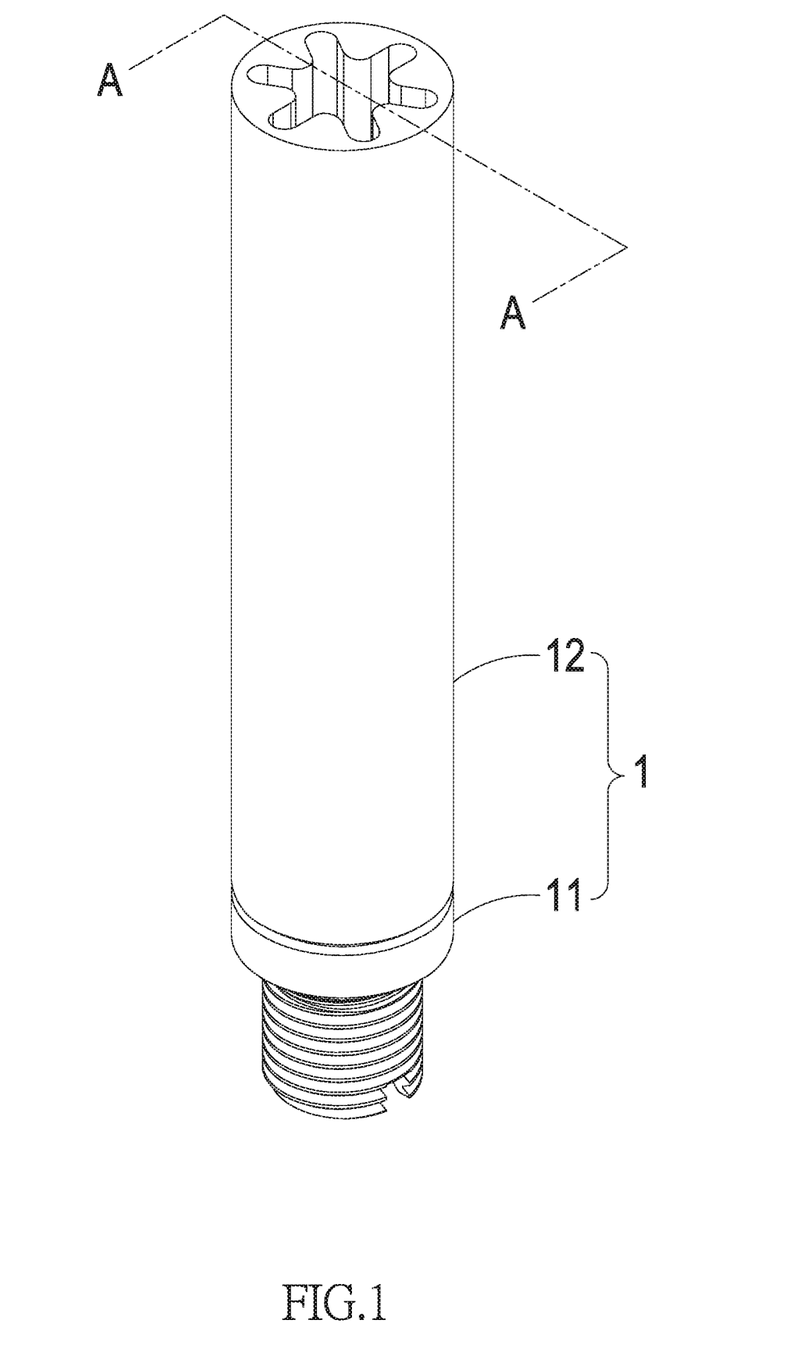
FIG. 1 is a perspective diagram showing a valve device according to an embodiment of the present invention.
Figure 2:
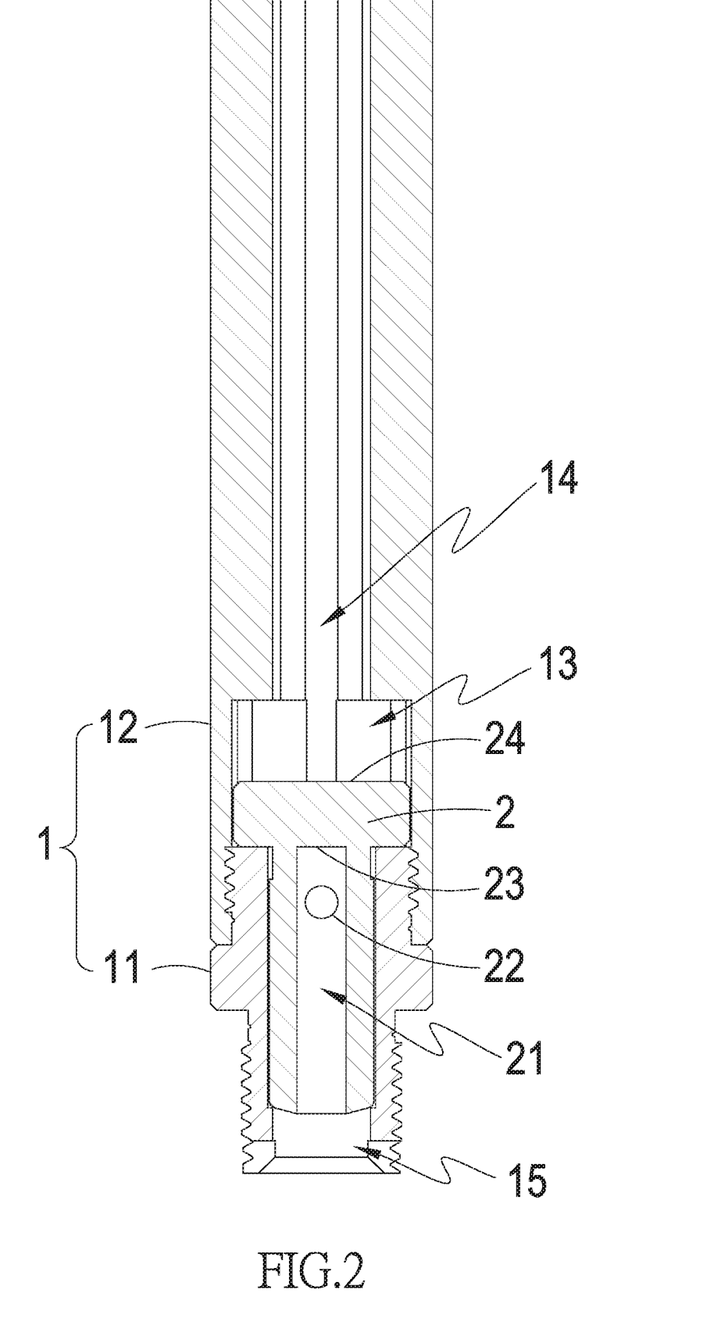
FIG. 2 is a sectional diagram showing the valve device of FIG. 1 along the A-A line.
Figure 3:
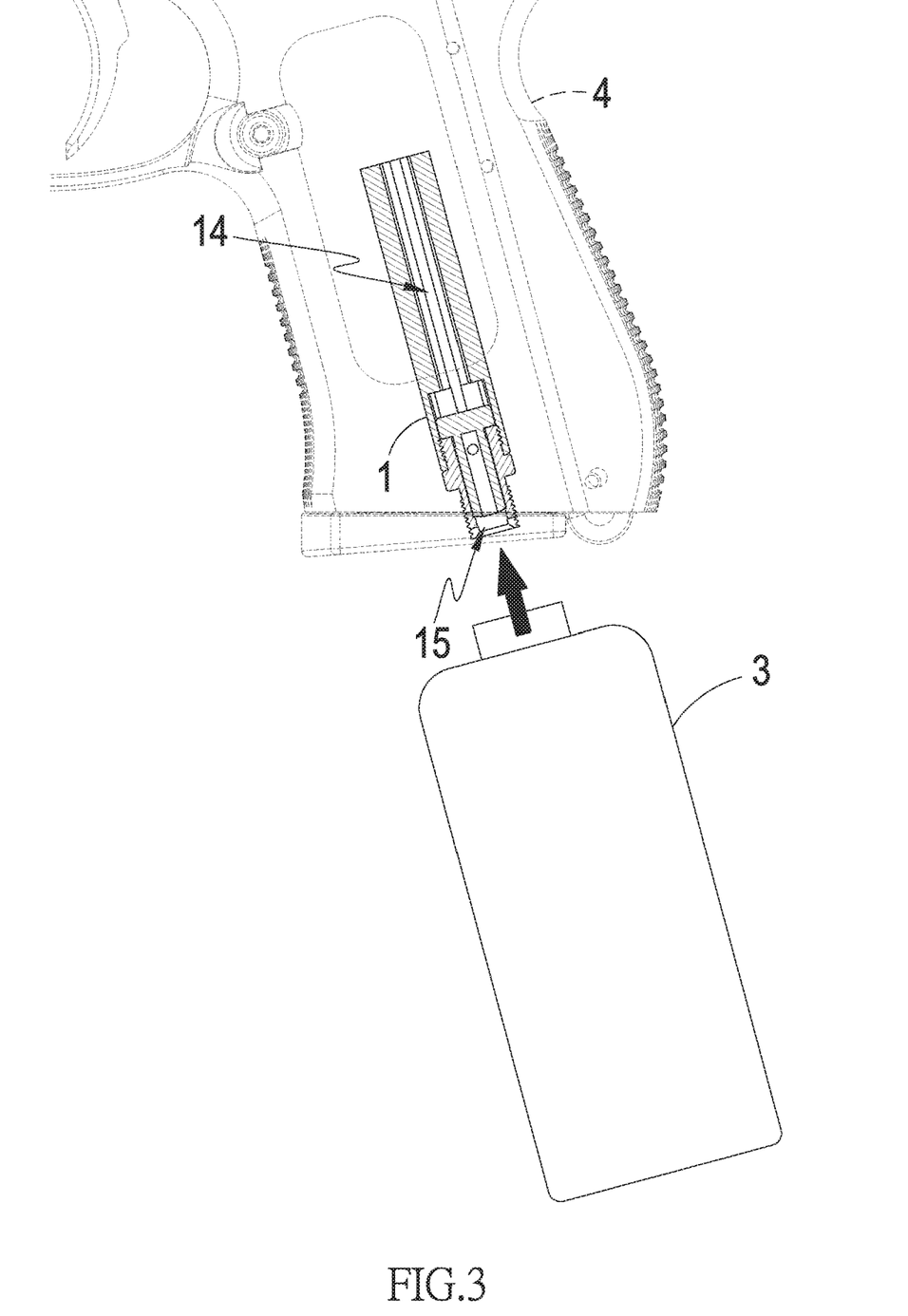
FIG. 3 is a schematic diagram showing the valve device of FIG. 1 connecting a high-pressure gas source to a toy gun.

As shown in the perspective and sectional diagrams of FIGS. 1 and 2, a valve device according to an embodiment of the present invention includes the following components.

There is a main member 1 formed by vertically joining a first piece 11 and a second piece 12. Inside the first piece 11, there is an inlet channel 15. Inside the second piece 12, there is a first chamber 13 and a second chamber 14 atop and connected to the first chamber 13.

There is a valve member 2 housed in the main member 1. The valve member 2 is moveably configured in the second piece 12 and may selectively block the connection between the first chamber 13 and the inlet channel 15. The valve member 2 includes a valve channel 21 and multiple through holes 22. The valve channel 21 is connected to the inlet channel 15, and the through holes 22 are connected to the valve channel 21 and selectively connected to the first chamber 13. The valve channel 21 has a diameter between 1.2 and 1.8 mm, and preferably is 1.5 mm. This diameter is greater than that of a conventional valve, thereby allowing a greater flow and a faster speed of high-pressure gas. The valve member 2 also has an inlet blocking element 23 adjacent to the inlet channel 15 and an outlet blocking element 24 adjacent to the second chamber 14.

As shown in FIGS. 1 to 5, the main member 1 of the valve device is joined to a toy gun member 4 by plugging an outer end of the second chamber 14 into the toy gun member 4. The second chamber 14 therefore is connected to an internal space of the toy gun member 4. Then a high-pressure gas source 3 is connected to an outer end of the inlet channel 15. The high-pressure gas therefore may enter the inlet channel 15. In the present embodiment, the high-pressure gas source 3 is a can of liquid gas.

Figure 4:
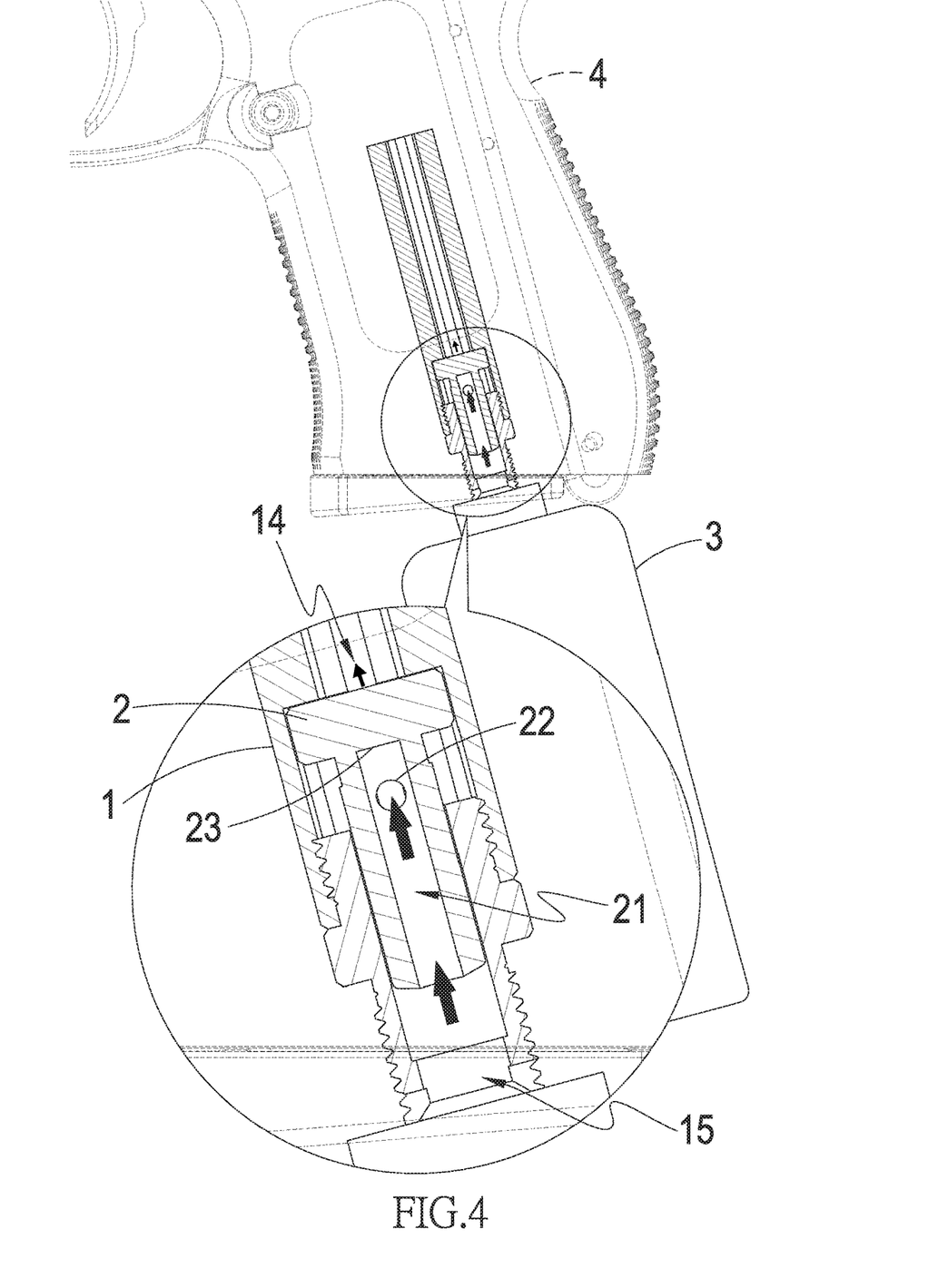
FIG. 4 is a schematic diagram showing the valve device of FIG. 3 where high-pressure gas enters the toy gun.

The high-pressure gas in the inlet channel 15 has a greater pressure than that of the second chamber and, as the high-pressure gas pushes the inlet blocking element 23, the valve member 2 is driven toward the second chamber 14. In the meantime, the through hole 22 on the valve member 2 is connected to the first chamber 13, and the high-pressure gas enters the first chamber 13 through the valve channel 21 and the through hole 22. The high-pressure gas then enters the internal space of the toy gun member 4 through the first and second chambers 13 and 14, so as to supplement the high-pressure gas of the toy gun member 4.

Figure 5:
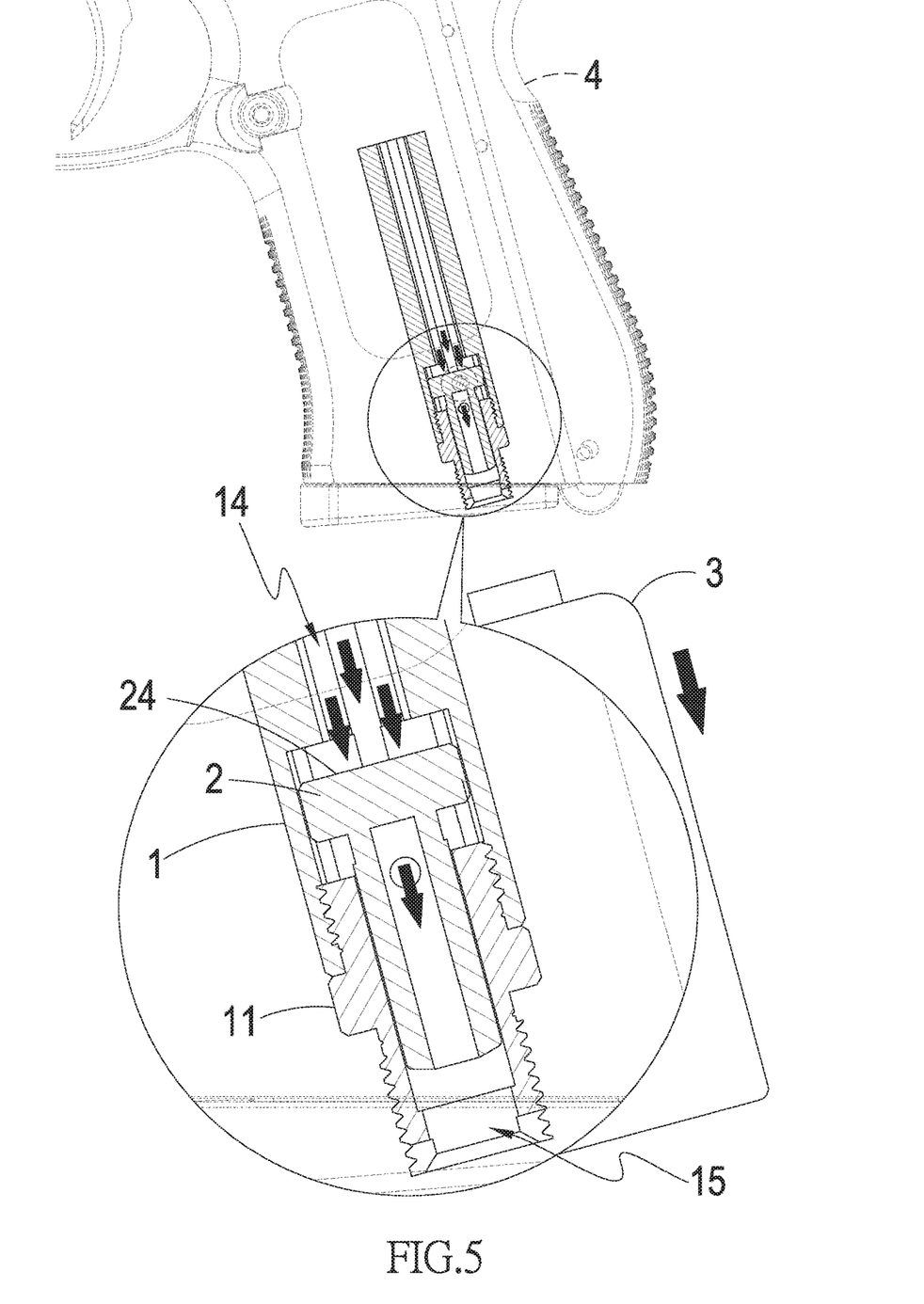
FIG. 5 is a schematic diagram showing the valve device of FIG. 3 where the high-pressure gas source is disconnected.
Figure 6:
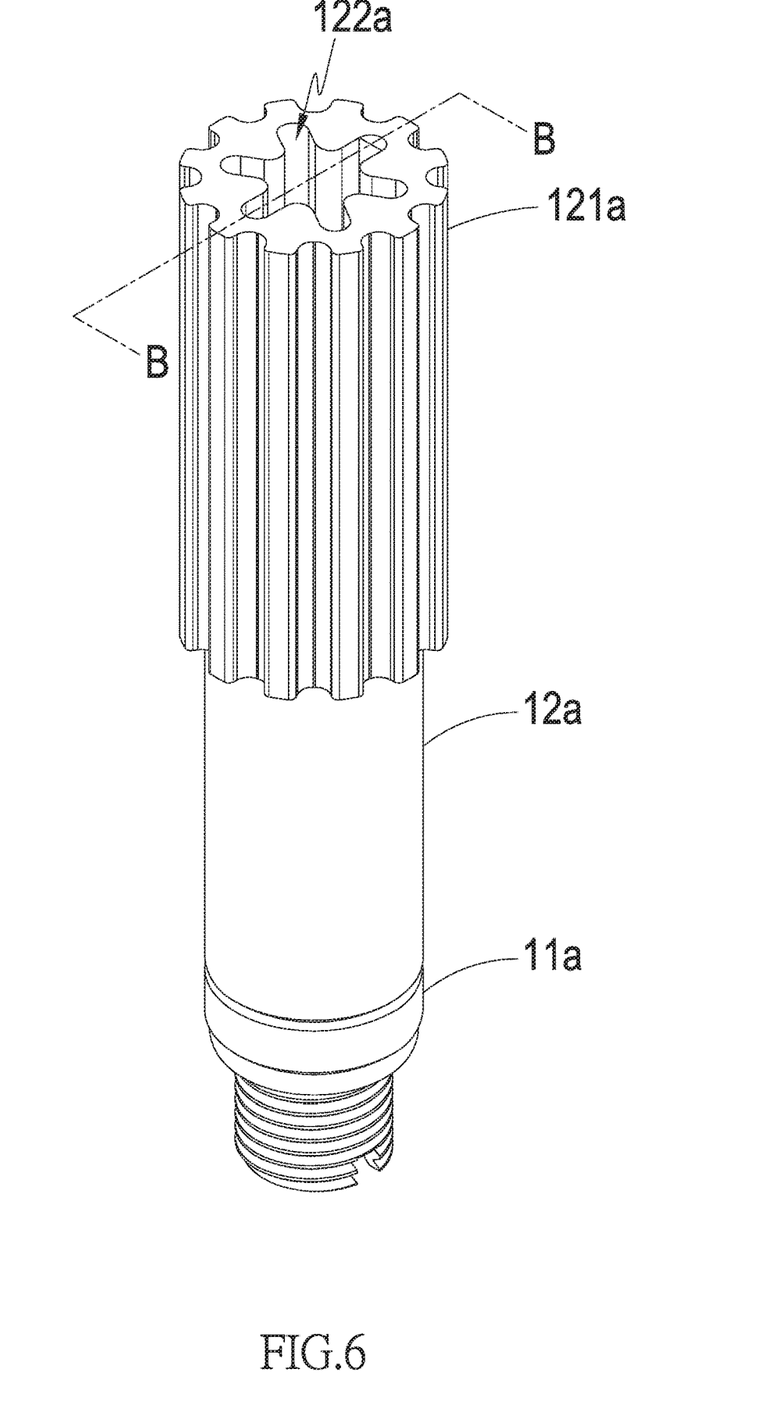
FIG. 6 is a perspective diagram showing a valve device according to another embodiment of the present invention.

When the high-pressure gas source 3 is detached or no high-pressure gas is supplied, the pressure inside the second chamber 14 would be greater than that inside the inlet channel 15, the pressure difference causes the outlet blocking element 24 to move and the valve member 2 is driven toward the inlet channel 15 to press the first piece 11. The connection between the inlet channel 15 and the first chamber 13 is blocked and gas inside the second chamber 14 therefore does not leak. Compared to the prior art, the present embodiment does not involve any spring to close the inlet channel 15. Therefore, there is no operation life issue due to spring fatigue, and cost is reduced from the omission of a spring.

As shown in FIGS. 6 to 9, according to a second embodiment, the second piece 12 has a number of axially extending, heat-transferring protrusions 121a arranged along the outer circumference around the outer end of the second chamber 14a. The second chamber 14a has a number of ducts 122a along its inner wall. When high-pressure gas enters the second chamber 14a, it flows along the ducts 122a into the toy gun 4a. The ducts 122a provide enlarged contact area between the high-pressure gas and the second piece 12a so as to enhance heat transfer. The protrusions 121a further enhances the heat transfer effect so as to prevent the high-pressure gas from frosting or condensing when it is not thoroughly gasified. The firing of the toy gun 4a therefore may be smoother.

Figure 7:
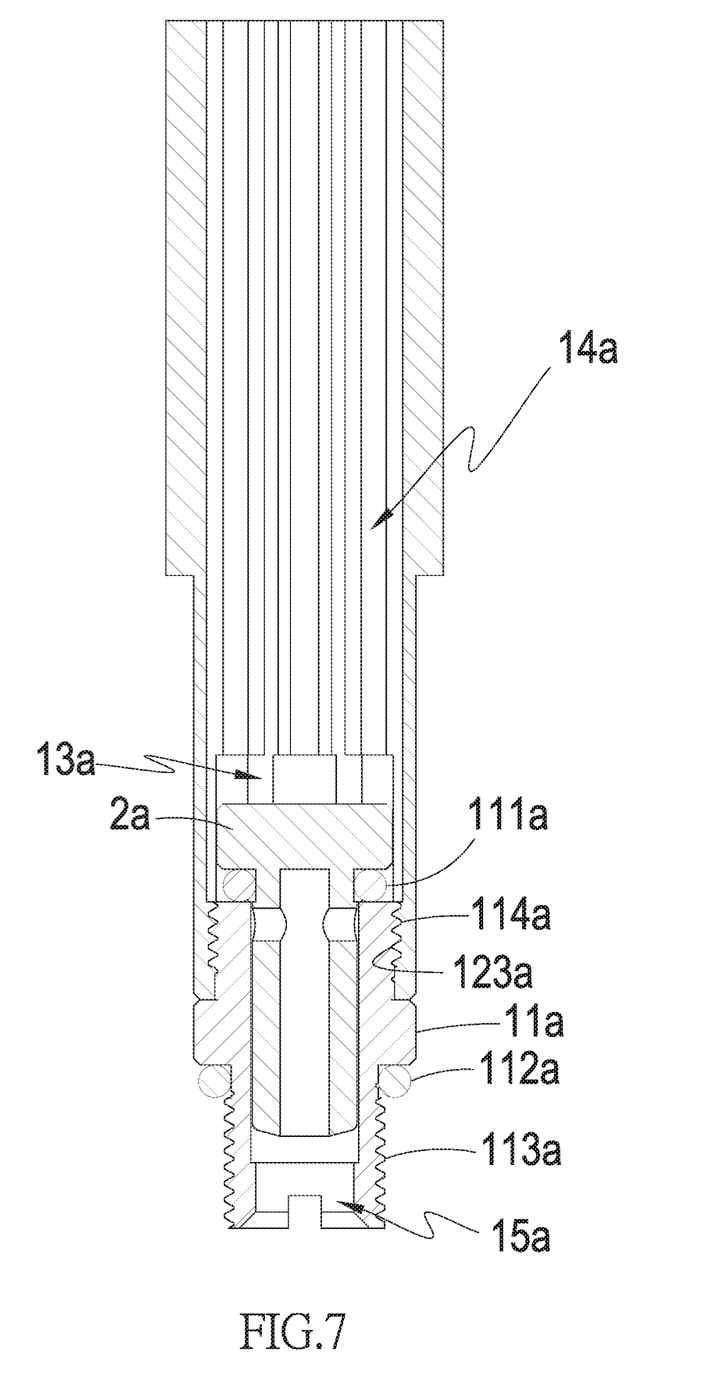
FIG. 7 is a sectional diagram showing the valve device of FIG. 6 along the B-B line.
Figure 8:
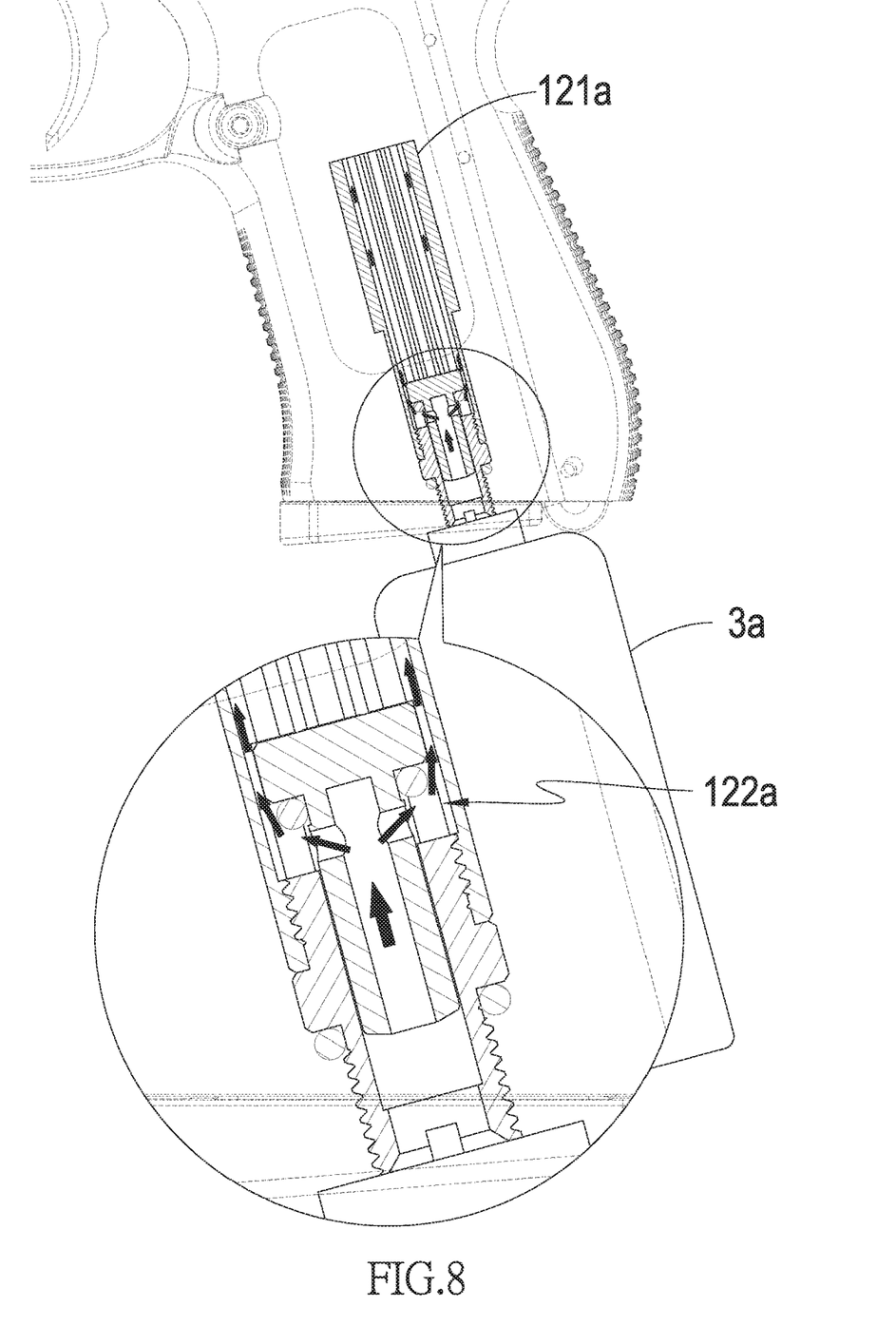
FIG. 8 is a schematic diagram showing the valve device of FIG. 7 where the high-pressure gas source enters a toy gun.
Figure 9:
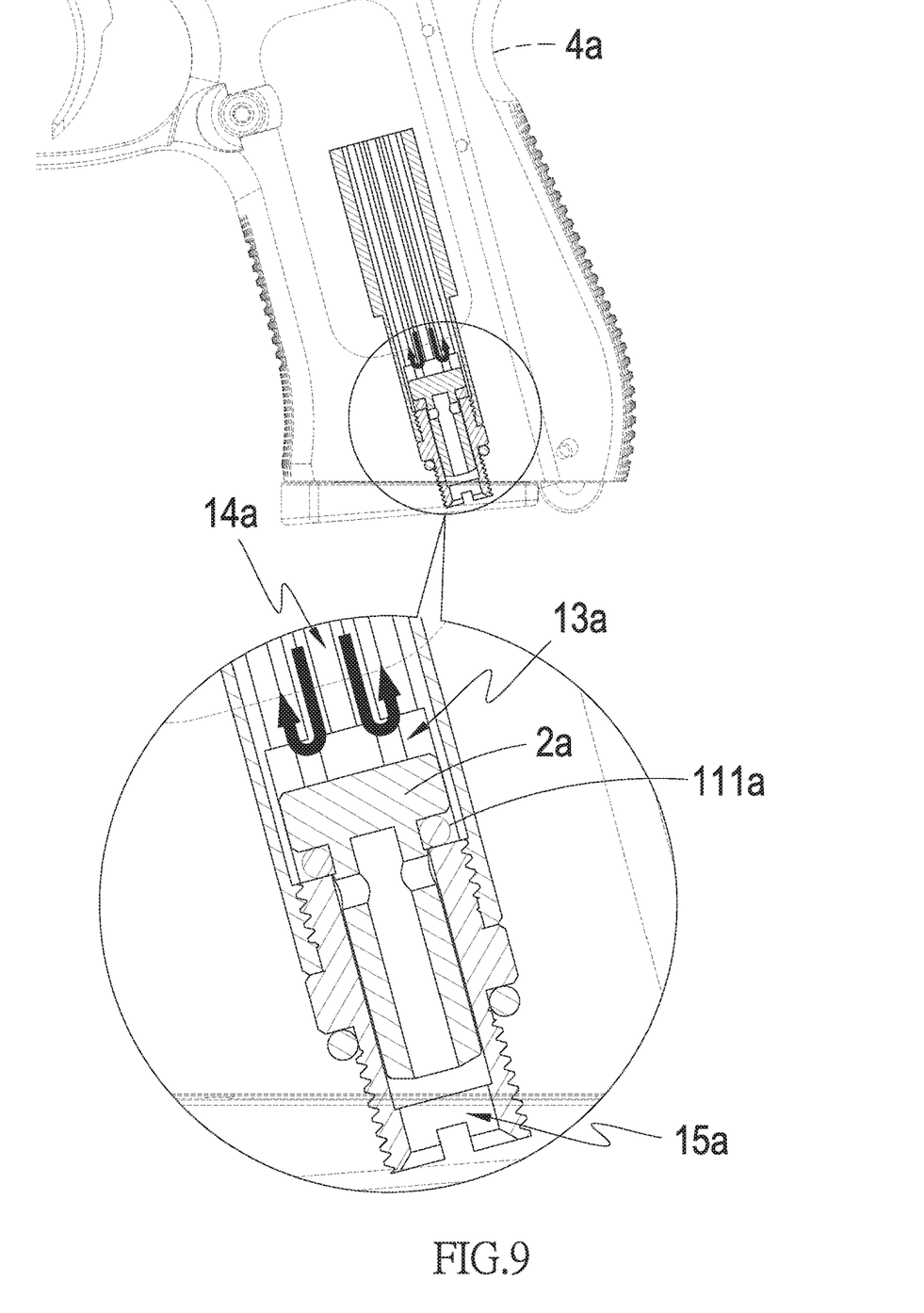
FIG. 9 is a schematic diagram showing the valve device of FIG. 7 where the high-pressure gas source is disconnected.

A first buffer element 111a is provided between the valve member 2a and the first piece 11a, and a second buffer element 112a is provided adjacent to an outer end of the first piece 11a where the high-pressure gas source 3a is connected. The first and second buffer elements 111a and 112a are both flexible rubber rings. When the valve member 2a blocks connection between the first chamber 13a and the inlet channel 15a, and when the first piece 11a is connected to the high-pressure gas source 3a, the first and second buffer elements 111a and 112a provides tighter connection.

The first piece 11a further includes a first fastening element 113a around the outer end to secure the connection with the high-pressure gas source 3a, and a second fastening element 114a around an inner end. Correspondingly, the second piece 12a has a third fastening element 123a, so that the second and third fastening elements 114a and 123a may engage each other to secure the connection of the first and second pieces 1a and 12a. The first, second, and third fastening elements 113a, 114a, 123a are threads in the present embodiment.

As described, the valve device of the present invention is characterized in the following features.

Firstly, the pressure difference between the second chamber 14 and the high-pressure gas source 3 drives the valve member 2 to selectively block the inlet channel 15, without using spring to control the valve member 2. The valve device therefore has enhanced operation life and reduced cost.

Secondly, more thorough gasification of the high-pressure gas is guaranteed by the protrusions 121 a and the ducts 122a, thereby preventing frosting and condensing and prolonging the toy gun's operation life.

Thirdly, as the valve channel 21 has a greater diameter than that of the prior art, high-pressure gas may pass through the valve channel 21 at a greater speed and with a larger volume.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A valve device for a toy gun, comprising:
   a main member for detachably connecting a high-pressure gas source at an outer end and for plugging an inner end into the toy gun;
   a first chamber inside the main member;
   a second chamber inside the main member connected to the first chamber and an internal space of the toy gun;
   an inlet channel inside the main member, connected to the first chamber and selectively connected to the high-pressure gas;
   a valve member moveably configured in the first chamber selectively blocking a connection between the first chamber and the inlet channel, where the valve member has a valve channel and at least a through hole, the valve channel is connected to the inlet channel, and the through hole is connected to the valve channel and the first chamber;
   an inlet blocking element on the valve member adjacent to the inlet channel; and
   an outlet blocking element on the valve member adjacent to the second chamber;
   wherein, when the high-pressure gas source is connected to an outer end of the inlet channel, the inlet channel has a greater pressure than that of the second chamber, the inlet blocking element is pressed, the valve member is driven toward the second chamber, and high-pressure gas enters the second chamber through the first chamber; and, when the high-pressure gas source is detached or no high-pressure gas is supplied, pressure inside the second chamber is greater than that inside the inlet channel, the outlet blocking element is pressed, the valve member is driven to block the inlet channel, and a connection between the inlet channel and the first chamber is blocked.

2. The valve device according to claim 1, wherein the main member comprises a first piece and a second piece joined to the first piece; the first and second chambers are inside the second piece; the second chamber is adjacent to where the toy gun is connected; the first chamber is adjacent to where the first piece is joined; the inlet channel is inside the first piece; the first piece is for connecting the high-pressure gas source; the valve member is movably configured in the second piece and partially into the inlet channel.

3. The valve device according to claim 2, wherein a first buffer element is disposed between the valve member and the first piece.

4. The valve device according to claim 2, wherein a second buffer element is disposed adjacent to an outer end of the first piece where the high-pressure gas source is connected.

5. The valve device according to claim 2, wherein the second piece has at least an axially extending, heat-transferring protrusion arranged along an outer circumference around an outer end of the second chamber.

6. The valve device according to claim 5, wherein the second chamber has a plurality of ducts along its inner wall.

7. The valve device according to claim 2, wherein the first piece has a first fastening element around an outer end to secure the connection with the high-pressure gas source.

8. The valve device according to claim 2, wherein the first piece has a second fastening element around an inner end.

9. The valve device according to claim 8, wherein the second piece has a third fastening element corresponding to and engaging the second fastening element.

10. The valve device according to claim 1, wherein the valve channel has a diameter between 1.2 and 1.8 mm.

* * * * *